United States Patent [19]
Ito

[11] Patent Number: 5,245,975
[45] Date of Patent: Sep. 21, 1993

[54] DIRECT INJECTION TYPE INTERNAL COMBUSTION ENGINE

[75] Inventor: Yasusi Ito, Susono, Japan

[73] Assignee: Toyota Jidosha Kabushiki Kaisha, Toyota, Japan

[21] Appl. No.: 795,979

[22] Filed: Nov. 22, 1991

[30] Foreign Application Priority Data

Nov. 28, 1990 [JP] Japan .............................. 2-322674
Mar. 26, 1991 [JP] Japan .............................. 3-060625

[51] Int. Cl.⁵ .......................................... F02M 33/02
[52] U.S. Cl. .......................... 123/520; 60/283
[58] Field of Search ............... 60/285, 283; 123/518, 123/519, 520, 521

[56] References Cited

U.S. PATENT DOCUMENTS

| | | |
|---|---|---|
| 3,618,314 | 11/1971 | Krebs ................................ 60/283 |
| 3,680,318 | 8/1972 | Nakajima ........................... 60/283 |
| 4,467,769 | 8/1984 | Matsumura ....................... 123/489 |
| 4,646,702 | 3/1987 | Matsubara ......................... 123/520 |
| 4,955,339 | 9/1990 | Sasaki ................................ 123/295 |
| 4,960,083 | 10/1990 | Seki ................................... 60/285 |
| 4,986,070 | 1/1991 | Abe .................................... 123/520 |
| 5,129,228 | 7/1992 | Kondo ................................ 60/285 |

FOREIGN PATENT DOCUMENTS

3904760 10/1989 Fed. Rep. of Germany .
0125553 5/1989 Japan ................................. 123/519

Primary Examiner—Carl S. Miller
Attorney, Agent, or Firm—Kenyon & Kenyon

[57] ABSTRACT

A direct injection type engine in which an air-fuel mixture formed in a restricted region in the combustion chamber is burned in the presence of excess air when the engine is operating under a light load. A uniform air-fuel mixture is formed in the combustion chamber when the engine becomes high, a fuel vapor is purged into the intake passage of the engine from the charcoal canister, and a catalytic converter is arranged in the exhaust passage of the engine. To prevent fuel vapor from being discharged to the outside air, the purging of fuel vapor into the intake passage is stopped when the engine is operating under a light load and the temperature of the catalyzer of the catalytic converter is low.

16 Claims, 12 Drawing Sheets

DIRECT INJECTION TYPE INTERNAL COMBUSTION ENGINE

BACKGROUND OF THE INVENTION

1. Field of the Invention

The present invention relates to a direct injection type internal combustion engine.

2. Description of the Related Art

In a known direct injection type engine, when the engine is operating under a light load, an air-fuel mixture is formed in a restricted region in the combustion chamber, the remainder of the combustion chamber is filled with air, and the air-fuel mixture is ignited by the spark plug. Conversely, when the engine is operating under a middle load or under a high load, the entire interior of the combustion chamber is filled with an air-fuel mixture (U.S. Pat. No. 4,955,339)

Usually, an engine has a construction such that a fuel vapor produced in, for example, the fuel tank, is purged into the intake passage of the engine, and to this end, the engine is normally provided with a purge control device. When, however, the air-fuel mixture is burned in the presence of excess air when the engine is operating under a light load, as in the above-mentioned direct injection type engine, if the fuel vapor is purged into the intake passage of the engine when the engine is operating under a light load, the fuel vapor spreads in the air in the combustion chamber, and thus a large part of the fuel vapor is discharged into the exhaust passage of the engine without being burned. Nevertheless, in such an engine, a catalytic converter for purifying the exhaust gas is normally arranged in the exhaust passage of the engine, and therefore, even if a large part of the fuel vapor is discharged into the exhaust passage without being burned, as mentioned above, the fuel vapor is oxidized, i.e., purified, in the catalytic converter, and there is no danger of a harmful gas being discharged into the outside air.

Nevertheless, the oxidizing of the fuel vapor by the catalyzer, i.e., the exhaust gas purifying operation, cannot be properly carried out until the temperature of the catalyzer in the catalytic converter rises to a given temperature, i.e., until the catalyzer is activated. Accordingly, when the temperature of the catalyzer is lower than the tolerable minimum temperature at which the fuel vapor can be sufficiently oxidized, i.e., at which the exhaust gas can be sufficiently purified, if the fuel vapor is discharged into the exhaust passage, a problem occurs in that the fuel vapor is discharged into the outside air without being fully oxidized, i.e., a harmful gas is discharged into the outside air.

SUMMARY OF THE INVENTION

An object of the present invention is to provide a direct injection type engine capable of suppressing a discharge of harmful gas into the outside air.

According to the present invention, there is provided a direct injection type engine having a combustion chamber, an intake passage and an exhaust passage, said engine comprising: an air-fuel mixture forming means for forming an air-fuel mixture in a restricted region in the combustion chamber when an engine load is lower than a predetermined load, and for forming an air-fuel mixture which spreads over the entire interior of the combustion chamber when the engine load is higher than the predetermined load; a spark plug arranged in the combustion chamber to ignite the air-fuel mixture; catalytic means arranged in the exhaust passage for purifying the exhaust gas; detecting means for detecting a temperature of the catalytic means; fuel vapor supply means for purging fuel vapor into the intake passage; and control means for controlling the fuel vapor supply means to prohibit the purging operation of the fuel vapor when the engine load is lower than the predetermined load and the temperature of the catalytic means is lower than a predetermined tolerable minimum temperature at which the exhaust gas can be purified.

The present invention may be more fully understood from the description of preferred embodiments of the invention set forth below, together with the accompanying drawings.

DESCRIPTION OF THE PREFERRED EMBODIMENTS

Figure 1:
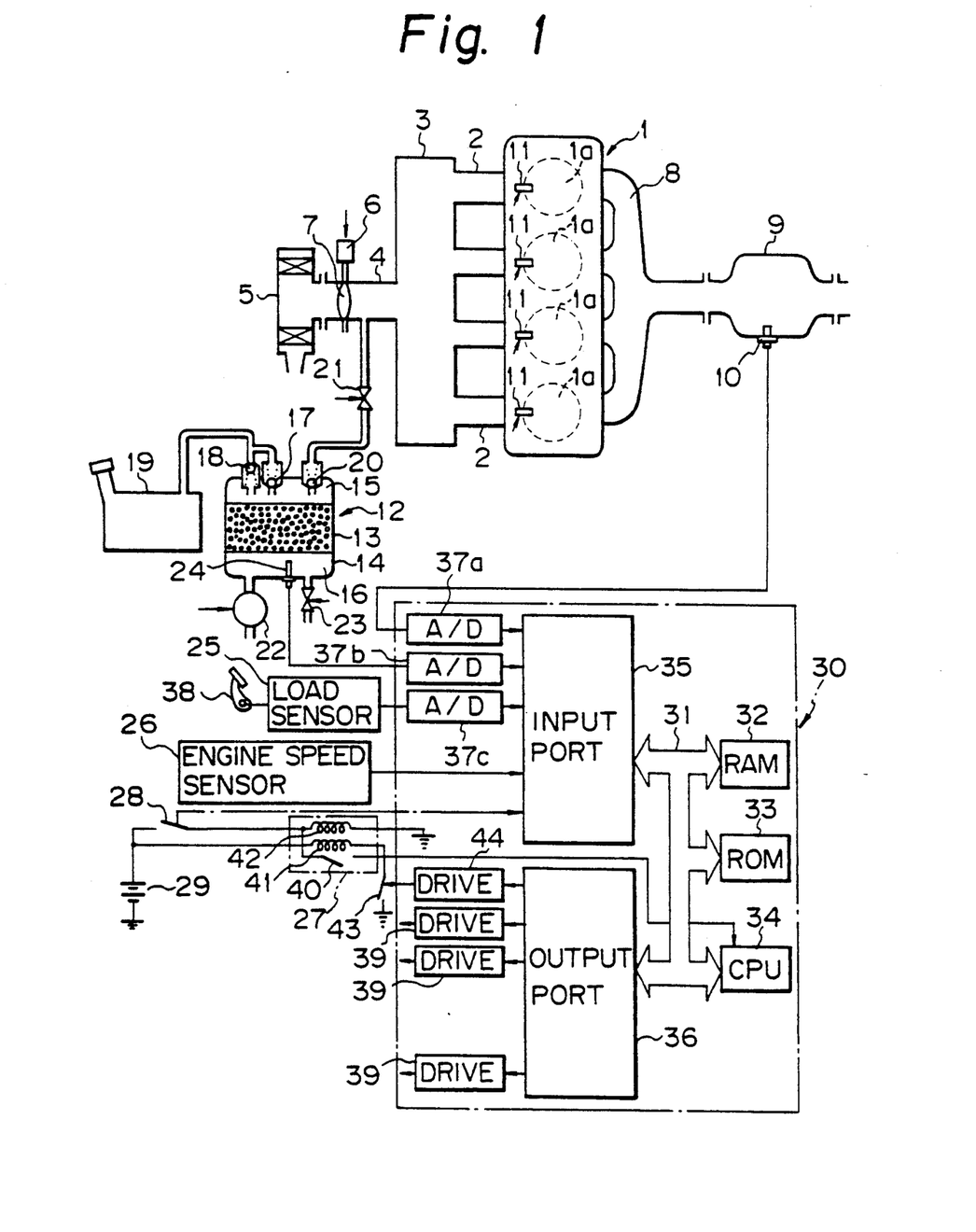
FIG. 1 is a general view of an engine.

Referring to FIG. 1, an engine body 1 has four cylinders 1a and each cylinder 1a is connected to a common surge tank 3 via a corresponding branch pipe 2; the surge tank 3 is connected to an air cleaner 5 via an intake duct 4. A throttle valve 7 driven by a step motor 6 is arranged in the intake duct 4, and this throttle valve 7 is partly closed when the engine is operating under an extremely low load, and remains fully open when the engine load becomes higher.

The cylinders 1a are connected to an exhaust manifold 8, which is connected to a three-way catalytic converter 9. A temperature sensor 10 for detecting the temperature of the three way catalyzer is attached to the three way catalytic converter 9. In addition, fuel injectors 11 are provided for the corresponding cylinders 1a and controlled by signals output from an electronic control unit 30.

As illustrated in FIG. 1, a purge control device 12 for feeding fuel vapor into the intake duct 4 is provided. This purge control device 12 comprises a charcoal canister 14 having an activated carbon layer 13 therein, and a fuel vapor chamber 15 and an air chamber 16 are formed in the canister 14 on each side of the activated carbon layer 13. The fuel vapor chamber 15 is connected on one hand to a fuel tank 19 via a pair of check valves 17 and 18 arranged in parallel and allowing only a flow of gas in opposite directions, and on the other hand to the intake duct 4 downstream of the throttle valve 7 via a check valve 21 allowing only a flow of gas from the fuel vapor chamber 15 toward the intake duct 4, via a first solenoid valve 21. Further, the air chamber 16 is connected on one hand to an air feed pump 22, and on the other hand, to the outside air via a second solenoid valve 23.

When the supply of fuel vapor to the intake duct 4 is to be stopped, the first solenoid valve 21 is closed and the air feed pump 22 is stopped, and at the same time, the second solenoid valve 23 is opened. At this time, fuel vapor generated in the fuel tank 19 flows into the fuel vapor chamber 15 via the check valve 18, and this fuel vapor is adsorbed by the activated carbon of the activated carbon layer 13. Thereafter, the air from which fuel component has been removed in the activated carbon layer 13 is discharged into the outside air via the second solenoid valve 23. When the pressure in the fuel tank 19 drops, the solenoid 17 is opened, and therefore, functions to prevent a deformation of the fuel tank 19 due to the pressure drop in the fuel tank 19.

When fuel vapor is to be fed into the intake duct 4, the first solenoid valve 21 is opened and the second solenoid valve 23 is closed, and at the same time, the air feed pump 22 is driven. When the air feed pump 22 is driven, air is discharged from the air feed pumps 22 into the air chamber 16 and then fed into the activated carbon layer 13. At this time, fuel adsorbed in the activated carbon is desorbed, and thus air containing a fuel component therein flows into the fuel vapor chamber 15. Then, the air containing the fuel component therein is fed into the intake duct 4 via the check valve 20 and the first solenoid valve 21. As mentioned above, in the embodiment illustrated in FIG. 1, the throttle valve 7 remains fully open under all engine operating states other than the extremely low load operating state. The air feed pump 22 is provided to enable fuel vapor to be fed into the intake duct 4 even when the throttle valve 7 is fully open.

As illustrated in FIG. 1, a sensor 24 for detecting the concentration of fuel vapor is arranged in the air chamber 16. Since fuel vapor generated in the fuel tank 16 is adsorbed in the activated carbons, normally almost no fuel vapor exists in the air chamber 16. Nevertheless, if the adsorption capability of the activated carbons for fuel vapor is saturated, the fuel vapor generated in the fuel tank 19 passes through the activated carbon layer 13 without being adsorbed therein, and flows into the air chamber 16, and then the fuel vapor is discharged into the outside air via the second solenoid valve 23. Accordingly, when the adsorption capability of the activated carbons for fuel vapor is saturated, the concentration of fuel vapor in the air chamber 16 becomes high, and thus it is possible to determine whether or not the adsorption capability of the activated carbons for fuel vapor is saturated by detecting the concentration of fuel vapor in the air chamber 16 by the sensor 24.

The electronic control unit 30 is constructed as a digital computer and comprises a RAM (random access memory) 32, a ROM (read only memory) 33, a CPU (microprocessor, etc.) 34, an input port 35 and an output port 36. The RAM 32, the ROM 33, the CPU 34, the input port 35 and the output port 36 are interconnected to each other via a bidirectional bus 31.

The temperature sensor 10 produces an output voltage proportional to the temperature of the three way catalyzer, and this output voltage is input to the input port 35 via an AD converter 37a. The sensor 24 produces an output voltage proportional to the concentration of fuel vapor in the air chamber 16, and this output voltage is input to the input port 35 via an AD converter 37b. An accelerator pedal 38 is connected to a load sensor 25 producing an output voltage proportional to the depression of the accelerator pedal 38, and the output voltage of the load sensor 25 is input to the input port 35 via an AD converter 37c. Further, an engine speed sensor 26, which produces output pulses representing an engine speed, is connected to the input port 35. Furthermore, the ON and OFF signal of an ignition switch 28 is input to the input port 35. The output port 36 is connected to the step motor 6, the fuel injectors 11, the first solenoid valve 21, the air feed pump 22 and the second solenoid valve 23 via corresponding drive circuits 39.

Also, the electronic control unit 30 is connected to a power source 29 via a relay 27 and the ignition switch 28. The relay 27 comprises a relay contact 40 and a pair of exciting coils 41, 42 for controlling the relay contact 40. The exciting coil 41 is grounded via a switch 43 which is connected to the output port 36 via a drive circuit 44. When the ignition switch 28 is made ON, the exciting coil 42 is energized and the relay contact 40 is made ON, and thus an electric power is applied to the electronic control unit 30. When the electric power is applied to the electronic control unit 30, data indicating that the switch 43 is made ON is output to the output port 36, and thus the exciting coil 41 is also energized.

When the ignition switch 28 is made OFF, the exciting coil 42 is deenergized, but the exciting coil 41 remains energized. Therefore, since the relay contact 40 remains ON, the electric power is still applied to the electronic control unit 30. When data indicating that the switch 43 is made OFF is output to the output port 36, the exciting coil 41 is deenergized, and as a result, since the relay contact 40 is made OFF, a power supply to the electronic control unit 30 is stopped.

Figure 2:
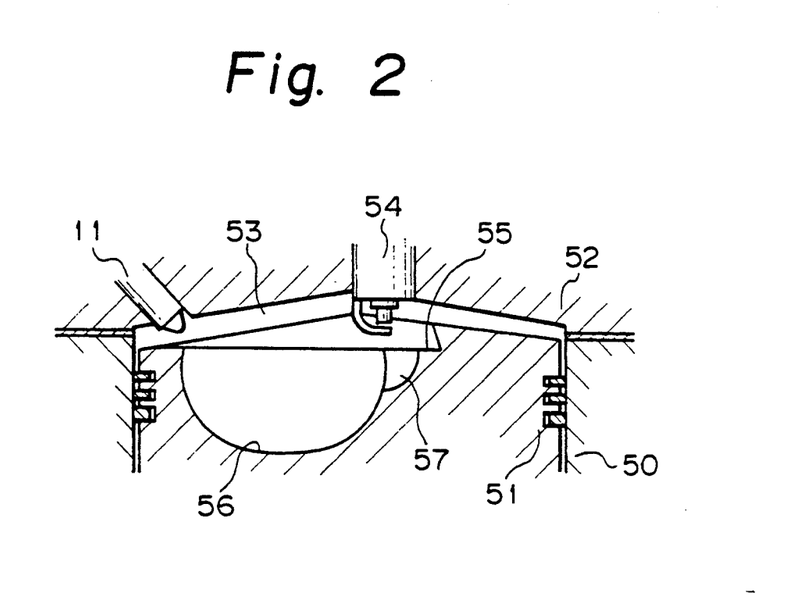
FIG. 2 is a cross-sectional view of the combustion chamber of the engine.
Figure 3:
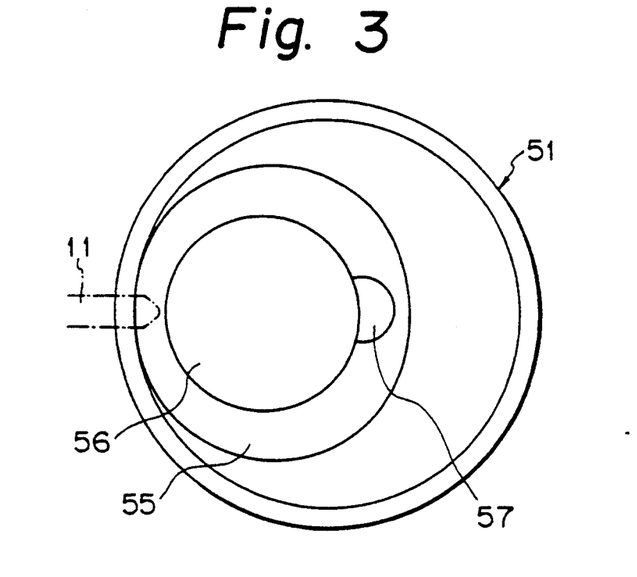
FIG. 3 is a plan view of a piston.

FIGS. 2 and 3 illustrate the construction of the combustion chamber of each cylinder 1a.

Referring to FIGS. 2 and 3, reference numeral 50 designates a cylinder block, 51 a piston reciprocally movable in the cylinder block 50, 52 a cylinder head fixed to the cylinder block 50, and 53 a combustion chamber formed between the piston 51 and the cylinder head 52. The intake valves and the exhaust valves (not shown) are arranged on the inner wall of the cylinder head 52, and the intake ports (not shown) are constructed so that air flowing into the combustion chamber 53 creates a swirl motion swirling about the axis of the cylinder. As illustrated in FIG. 2, a spark plug 54 is arranged on the central portion of the inner wall of the cylinder head 52, and the fuel injector 11 is arranged on the peripheral portion of the inner wall of the cylinder head 52. As illustrated in FIGS. 2 and 3, a shallow depression 55 having a substantially circular shaped contour and extending from a point beneath the fuel injector 11 to a point beneath the spark plug 54 is formed on the top face of the piston 51, and a deep depression 56 having a substantially semi-spherical shape is formed in the central portion of the shallow depression 55. In addition, a substantially spherical shaped recessed portion 57 is formed at the connecting portion of the shallow depression 55 and the deep depression 56 beneath the spark plug 54.

Figure 4A:
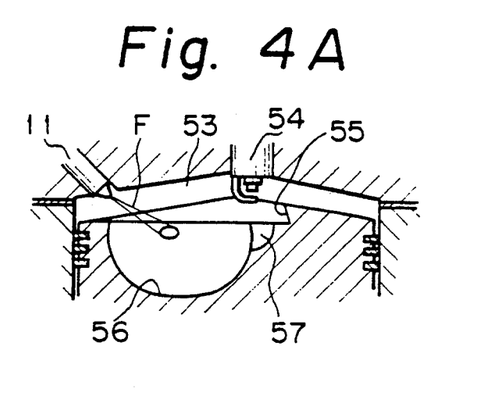
FIGS. 4A through 4C are views for illustrating the combustion method applied when the engine is operating under a light load.
Figure 4B:
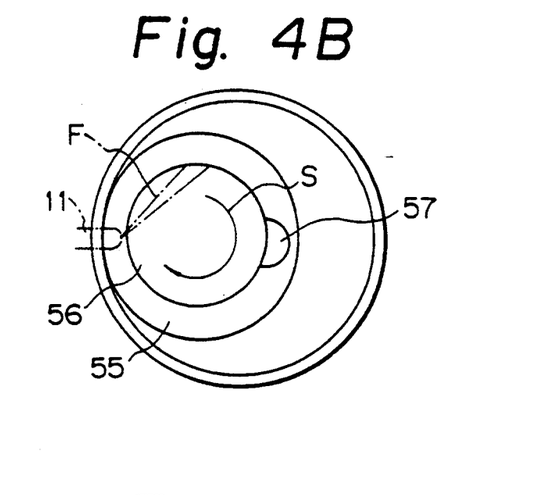
Figure 4C:
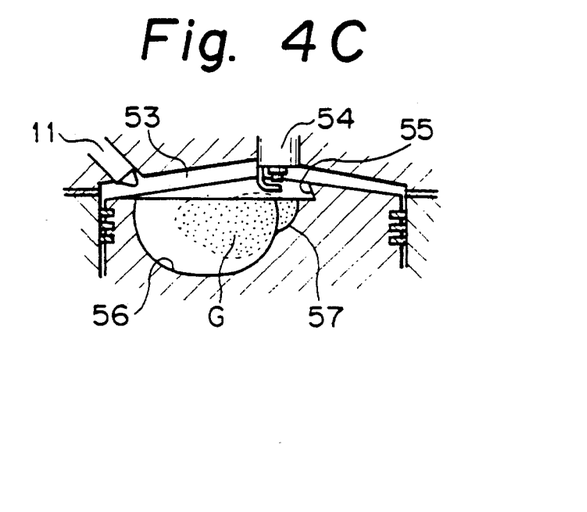

FIGS. 4A through 4C illustrate a combustion method when the engine is operating under a light load, and FIGS. 5A through 5D illustrate a combustion method when the engine is operating under a middle load. Also, FIG. 6 illustrates the relationship between the amount of fuel injected Q and the engine load, for example, the relationship between the amount of fuel injected Q and the depression L of the accelerator pedal 38.

Figure 6:
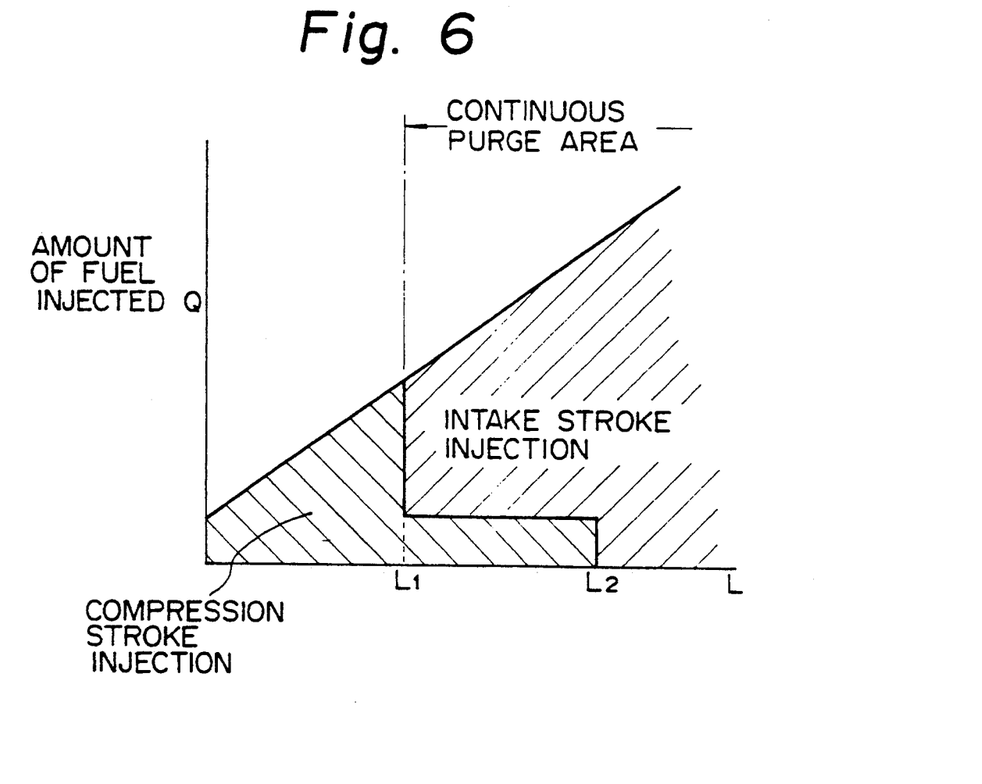
FIG. 6 is a diagram illustrating the amount of fuel injected.

When the engine is operating under a light load wherein the depression L of the acceleration pedal 38 is smaller than $L_1$ in FIG. 6, as illustrated in FIGS. 4A and 4B, fuel F, which is gasoline in the embodiment illustrated in FIGS. 4A through 4C, is injected toward the circumferential wall of the deep depression 56 at the end of the compression stroke. The amount of fuel injected Q when the engine is operating under the light load is increased as the depression L of the accelerator pedal 38 becomes larger, the fuel injected toward the circumferential wall of the deep depression 56 is spread while being vaporized by the swirl motion S, and as a result, as illustrated in FIG. 4C, an air-fuel mixture G is formed in the recessed portion 57 and the deep depression 56. At this time, the interior of the combustion chamber 53 other than the recessed portion 57 and the deep depression 57 is filled with air, and then the air-fuel mixture G is ignited by the spark plug 54.

Figure 5A:
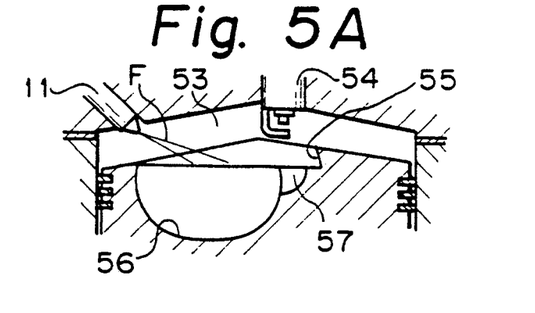
FIGS. 5A through 5D are views for illustrating the combustion method applied when the engine is operating under a middle load.
Figure 5B:
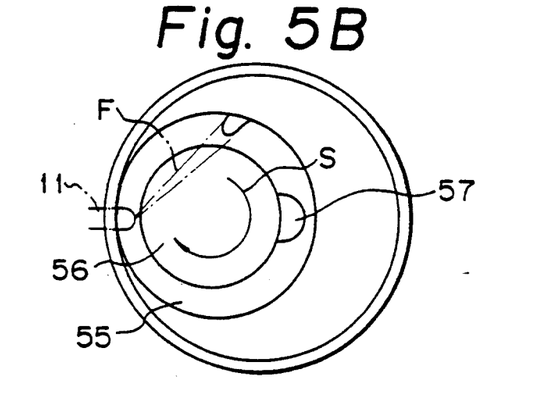
Figure 5C:
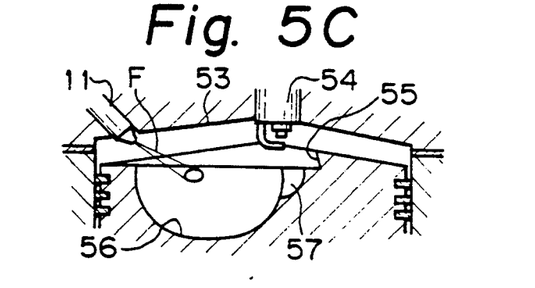
Figure 5D:
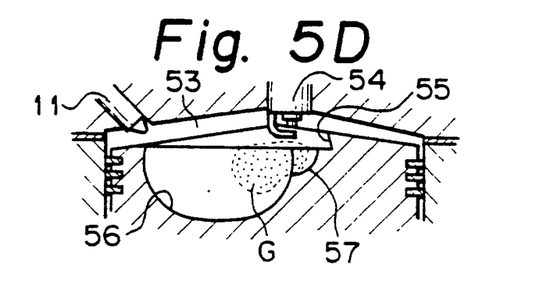

When the engine is operating under a middle load wherein the depression L of the accelerator pedal 38 is between $L_1$ and $L_2$ in FIG. 6, a fuel injection is carried out twice at the beginning of the intake stroke and at the end of the compression stroke. Namely, initially, as illustrated in FIGS. 5A and 5B, fuel F is injected toward the shallow depression 55 at the beginning of the intake stroke, and a lean air-fuel mixture is formed in the entire interior of the combustion chamber 53 by the injected fuel F. Then, as illustrated in FIG. 5C, fuel F is injected toward the circumferential wall of the deep depression 56 at the end of the compression stroke, and as illustrated in FIG. 5D, an ignitable air-fuel mixture G forming an ignition source is formed in the recessed portion 57 and the deep depression 56 by this injected fuel F. The air-fuel mixture G is ignited by the spark plug 54, and the lean air-fuel mixture existing in the entire interior of the combustion chamber 53 is burned by the flame of the air-fuel mixture G. In this case, since the fuel injected at the end of the compression stroke is simply used for creating the ignition source, the amount of fuel Q injected at the end of the compression stroke is maintained constant regardless of the depression L of the accelerator pedal 38, as illustrated, in FIG. 6, when the engine is operating under a middle load. Conversely, the amount of fuel injected Q injected at the beginning of the intake stroke is increased as the depression L of the accelerator pedal 38 becomes larger.

When the engine is operating under a heavy load wherein the depression L of the accelerator pedal 38 is larger than $L_2$ in FIG. 6, fuel is injected only once toward the shallow depression 55 at the beginning of the intake stroke, in the same manner as illustrated in FIGS. 5A and 5B, whereby a uniform air-fuel mixture is formed in the combustion chamber 53. At this time, as illustrated in FIG. 6, the amount of fuel injected Q injected at the beginning of the intake stroke is increased as the depression L of the accelerator pedal 38 becomes larger.

If fuel vapor is fed into the intake duct 4 when the engine is operating under a middle load or a high load, this fuel vapor forms, together with the fuel injected at the beginning of the compression stroke, an air-fuel mixture spreading over the entire interior of the combustion chamber 53, and accordingly, the fuel vapor is burned together with the injected fuel in the combustion chamber 53. Namely, at this time, the fuel vapor is used for increasing the output power of the engine.

Conversely, if fuel vapor is fed into the intake duct 4 when the engine is operating under a light load wherein the air-fuel mixture is burned in the presence of excess air, as illustrated in FIGS. 4A through 4C, almost all of the entire fuel vapor spreads into the air in the combustion chamber 53. Since the air-fuel mixture formed by the fuel vapor is extremely lean, however, a flame cannot propagate in this air-fuel mixture, and thus the fuel vapor spreading in the air is discharged into the exhaust manifold 8 without being burned.

Figure 7:
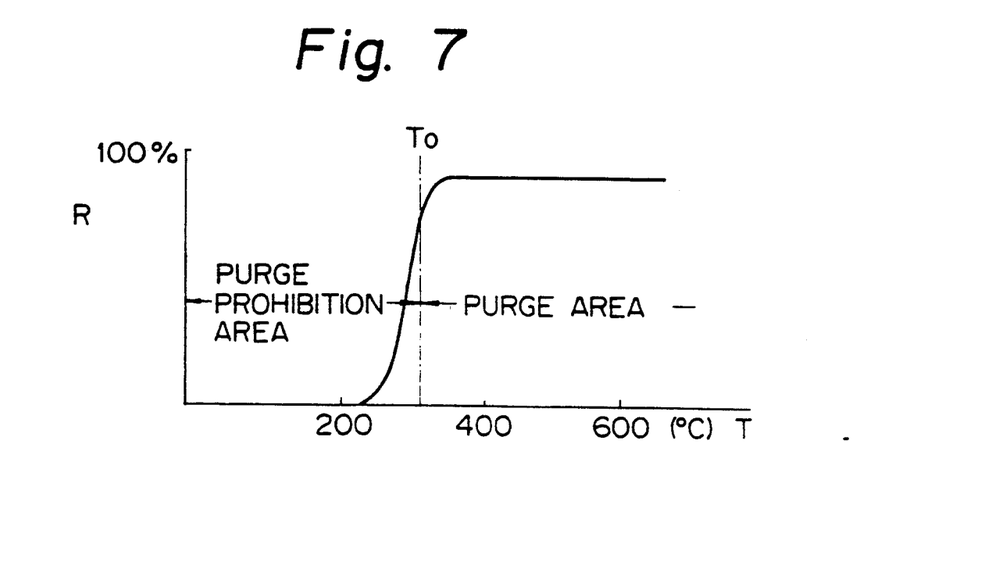
FIG. 7 is a diagram illustrating the exhaust gas purifying rate.

The fuel vapor discharged into the exhaust manifold 8 is fed into the catalytic converter 9 and oxidized therein, but as illustrated in FIG. 7, the exhaust gas purifying rate R does not become high until the temperature T of the catalyzer exceeds a given temperature. Namely, in FIG. 7, the temperature T of the catalyzer at which the exhaust gas purifying rate R becomes equal to 80 percent is called the tolerable minimum temperature $T_0$, and if the temperature T of the catalyzer is higher than the tolerable minimum temperature $T_0$, the fuel vapor can be sufficiently oxidized, but if the temperature T of the catalyzer is lower than the tolerable minimum temperature $T_0$, the fuel vapor cannot be sufficiently oxidized.

Accordingly, when the engine is operating under a light load wherein the air-fuel mixture G is burned in the presence of excess air, as illustrated in FIGS. 4A through 4C, if fuel vapor is fed into the intake duct 4 when the temperature T of the catalyzer is lower than the tolerable minimum temperature $T_0$, the fuel vapor cannot be sufficiently oxidized in the catalytic converter 9 and thus is discharged to the outside air. Conversely, even when the engine is operating under a light load, when the temperature T of the catalyzer is higher than the tolerable minimum temperature $T_0$, even if fuel vapor is fed into the intake duct 4, the fuel vapor is sufficiently oxidized. Further, when fuel vapor is fed into the intake duct 4 when the engine is operating under a middle or a high load wherein a fuel injection is carried out at the beginning of the intake stroke, since the fuel vapor is burned in the combustion chamber 53, there is no danger of the fuel vapor being discharged to the outside air, regardless of the temperature T of the catalyzer. Accordingly, in the embodiment according to the present invention, to prevent fuel vapor from being discharged to the outside air without being sufficiently oxidized, the supply of fuel vapor to the intake duct 4 is stopped only when the engine is operating under a light load and the temperature T of the catalyzer is lower than the tolerable minimum temperature $T_0$.

Nevertheless, even where the fuel vapor is supplied to the intake duct 4 when the engine is operating under a middle load or a high load, if the adsorbing capability of the activated carbon for fuel vapor is saturated, there is a danger that the fuel vapor will be discharged to the outside air via the second solenoid valve 23. Consequently, in the embodiment according to the present invention, where the adsorbing ability of the activated carbon for fuel vapor is saturated, fuel vapor is fed into the intake duct 4 even when the engine is operating under a light load and the temperature T of the catalyzer is lower than the tolerable minimum temperature $T_0$. At this time, although almost all of the fuel vapor is not burned in the combustion chamber 53 and is not sufficiently oxidized in the catalytic converter 9, a slight amount of the fuel vapor is burned in the combustion chamber 53, and the fuel vapor is partly oxidized in the catalytic converter 9. This is much preferable to the case wherein the fuel vapor is discharged as it is to the outside air via the second solenoid valve 23.

Next, the routine for executing the above described control of the supply of fuel vapor will be described with reference to FIGS. 8 and 9.

Figures 8, 8A:
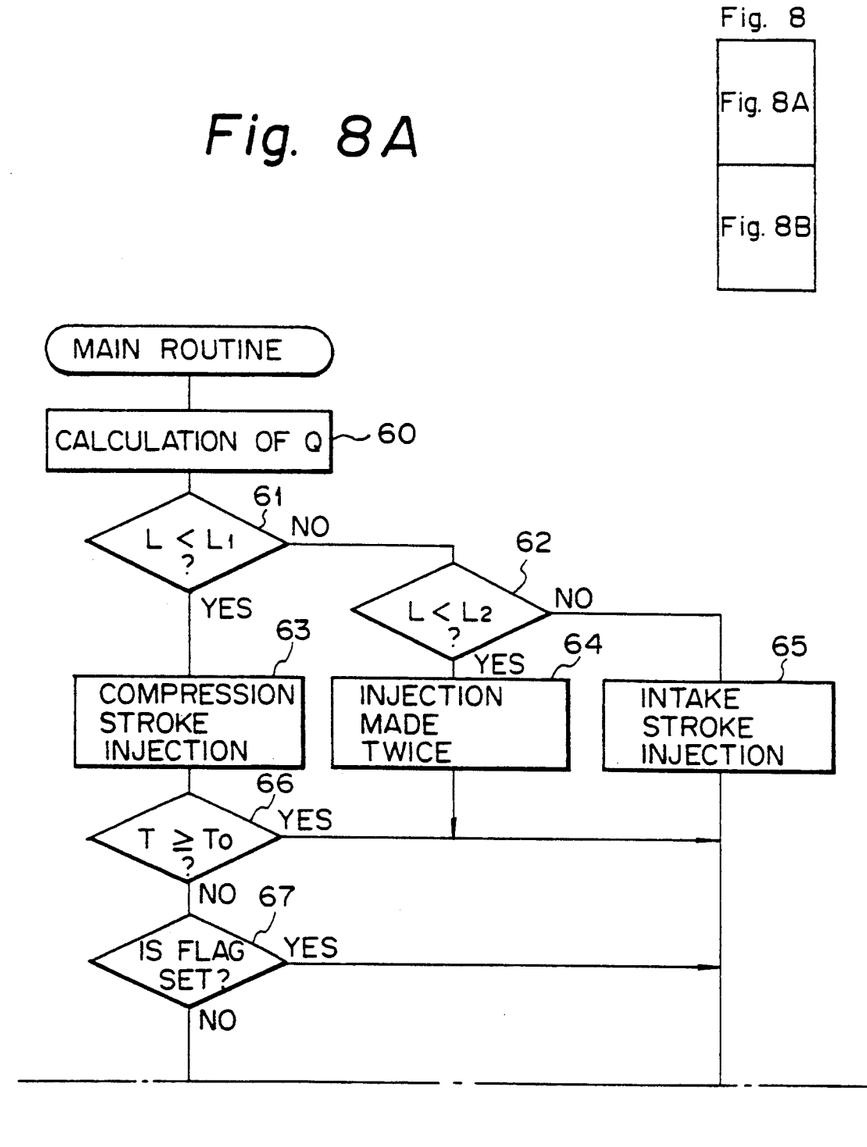
FIGS. 8 and 9 are a flow chart for executing a first embodiment of a main routine.
Figure 8B:
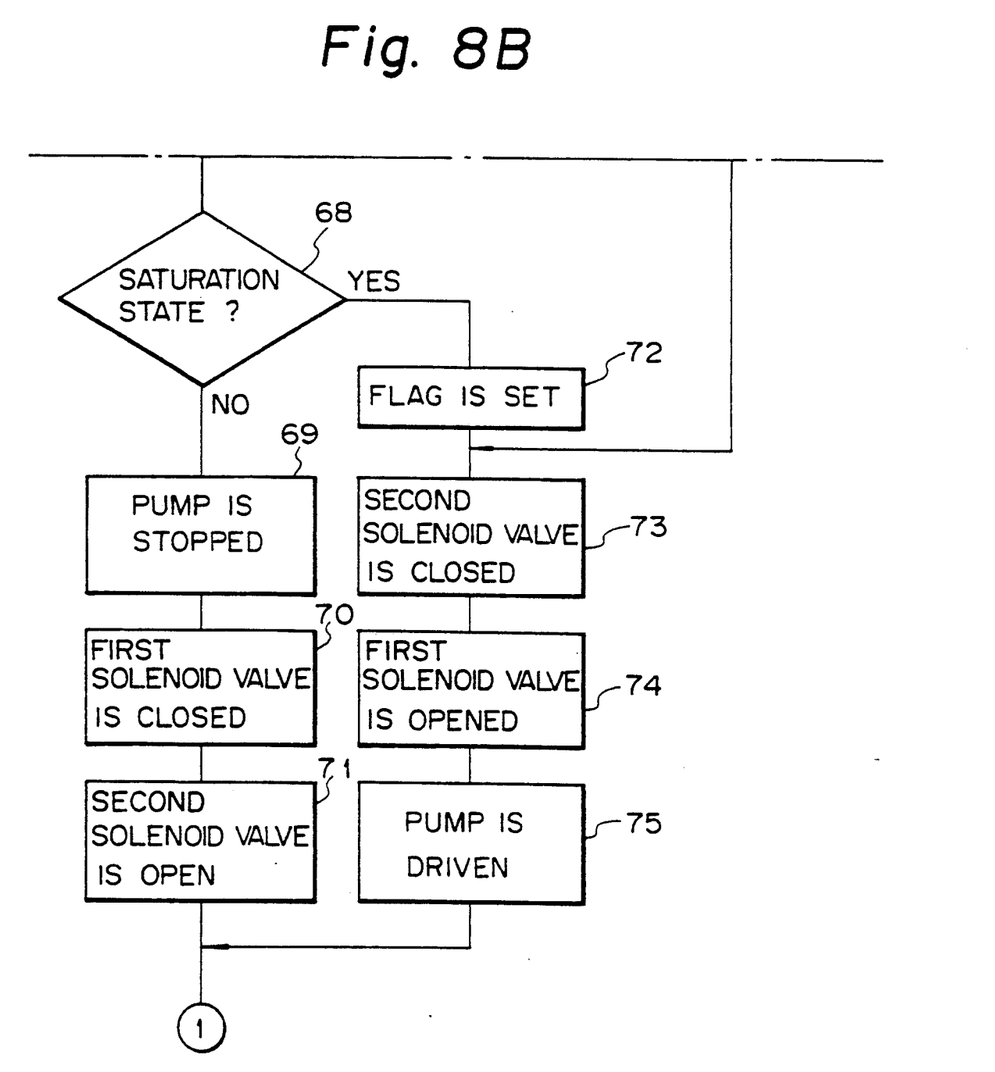
Figure 9:
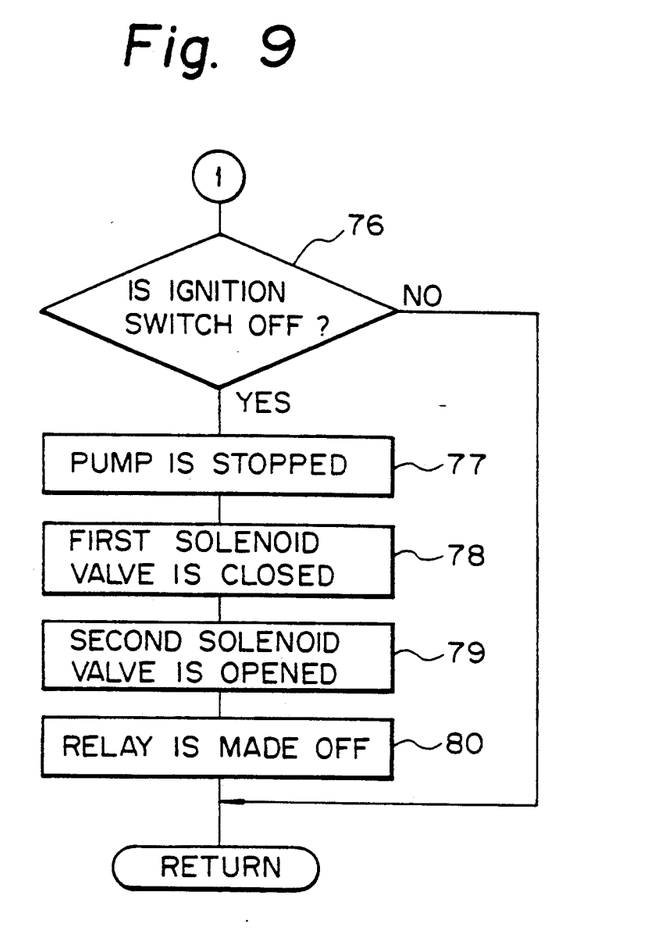
Figure 10:
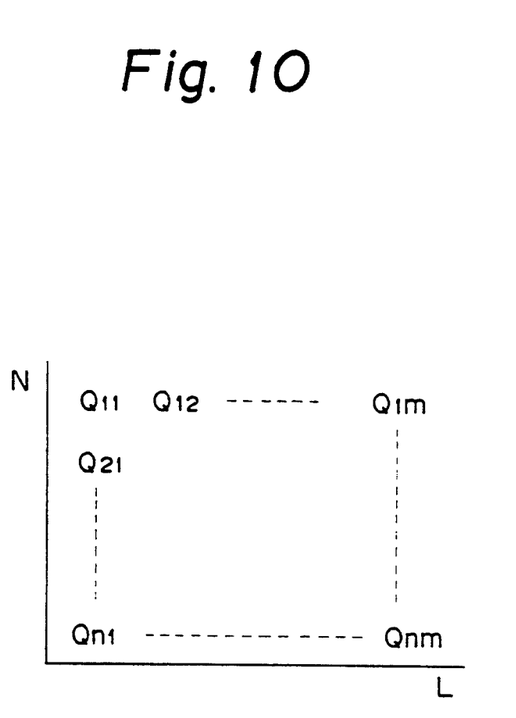
FIG. 10 is a view illustrating the amount of fuel injected.

Referring to FIGS. 8 and 9, in step 60, the amount of fuel injected Q is calculated. As illustrated in FIG. 10, this amount of fuel injected Q is stored in the ROM 33 as a function of the engine speed N and the depression L of the accelerator pedal 38. Then, in step 61, it is determined whether or not the depression L of the accelerator pedal 38 is smaller than $L_1$, i.e., the engine is operating under a light load. If $L<L_1$, the routine goes to step 63, and fuel is injected at the end of the compression stroke, and the routine then goes to step 66. If $L \geq L_1$, the routine goes to step 62, and it is determined whether or not the depression L of the accelerator pedal 38 is smaller than $L_2$, i.e., the engine is operating under a middle load. If $L<L_2$, the routine goes to step 64, and fuel is injected twice; once at the beginning of the intake stroke and once at the end of the compression stroke, and the routine then goes to step 73. If $L \geq L_2$, i.e., the engine is operating under a heavy load, the routine goes to step 65, and fuel is injected at the beginning of the intake stroke, and then the routine goes to step 73.

In step 73, the second solenoid valve 23 is closed, and in step 74 the first solenoid valve 21 is opened, and then, in step 75, the air feed pump 22 is driven. Accordingly, at this time, fuel vapor is purged into the intake duct 4, and the routine then goes to step 76.

In step 66, it is determined whether or not the temperature T of the catalyzer is higher than the tolerable minimum temperature $T_0$ on the basis of the output signal of the temperature sensor 10. If $T \geq T_0$, the routine goes to step 73. Accordingly, at this time, fuel vapor is purged into the intake duct 4. Conversely, if it is determined in step 66 that $T<T_0$, the routine goes to step 67.

In step 67, it is determined whether or not the flag, which is set when the adsorbing capability of the activated carbon for fuel vapor is saturated, is set. Since this flag is normally reset, the routine normally goes to step 68. In step 68, it is determined whether or not the concentration of fuel vapor in the air chamber 16 exceeds a predetermined concentration, i.e., the adsorbing capability of the activated carbon for fuel vapor is saturated, on the basis of the output signal of the sensor 24. If the adsorbing capability of the activated carbon for fuel vapor is not saturated, the routine goes to step 69, and the air feed pumps 22 is stopped. Then, in step 70, the first solenoid valve 21 is closed, and in step 71, the second solenoid valve 23 is opened. Accordingly, at this time, the supply of fuel vapor to the intake duct 4 is stopped, and the routine then goes to step 76.

When it is determined in step 68 that the adsorbing capability of the activated carbon for fuel vapor is saturated, the routine goes to step 72 and the flag is set for a predetermined time. The routine then goes to step 73. In the next processing cycle, the routine goes from step 67 to step 73, and thus fuel vapor is purged into the intake duct 4 for the time for which the flag is set.

In step 76, it is determined whether or not the ignition switch 28 is turned from ON to OFF. When the ignition switch 28 is turned from ON to OFF, the routine goes to step 77 and the air feed pump 22 is stopped. Then, in step 78, the first solenoid valve 21 is closed, and in step 79, the second solenoid valve 23 is opened. Then, in step 80, the switch 43 is made OFF, and thus the relay contact 40 is made OFF.

Figure 11:
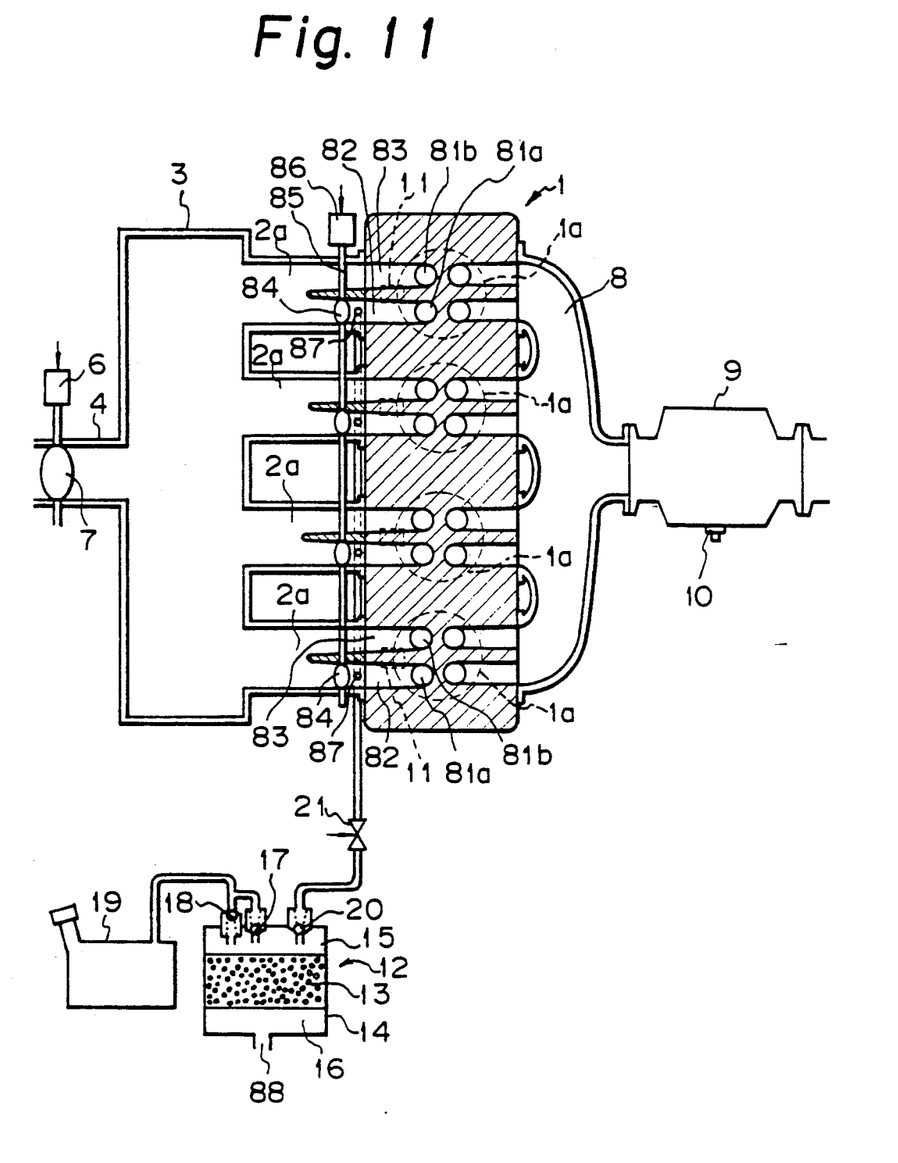
FIG. 11 is a cross-sectional plan view of another embodiment of an engine.

FIG. 11 illustrates another embodiment. In this embodiment, similar components are indicated with the same reference numerals as used in FIG. 1. Also, in this embodiment, an electronic control unit which is the same as the electronic control unit 30 illustrated in FIG. 1 is provided, but this electronic control unit is not depicted in FIG. 11.

In this embodiment, each cylinder 1a has a first intake valve 81a and a second intake valve 81b, and each intake branch passage 2a connected to the corresponding cylinder 1a is divided into a first intake passage 82 extending toward the first intake valve 81a, and a second intake passage 83 extending toward the second intake valve 81b. Intake control valves 84 are arranged in the corresponding first intake passages 82 and connected, via a common shaft 85, to an actuator 86 which is constituted by, for example, a step motor. This actuator 86 is controlled by a signal output from the electronic control unit. Fuel vapor outlets 87 are formed in the corresponding first intake passages 82 downstream of the intake control valves 84, and these fuel vapor outlets 87 are connected to the fuel vapor chamber 15 of the canister 14 via the solenoid 21 and the check valve 21.

Figure 12:
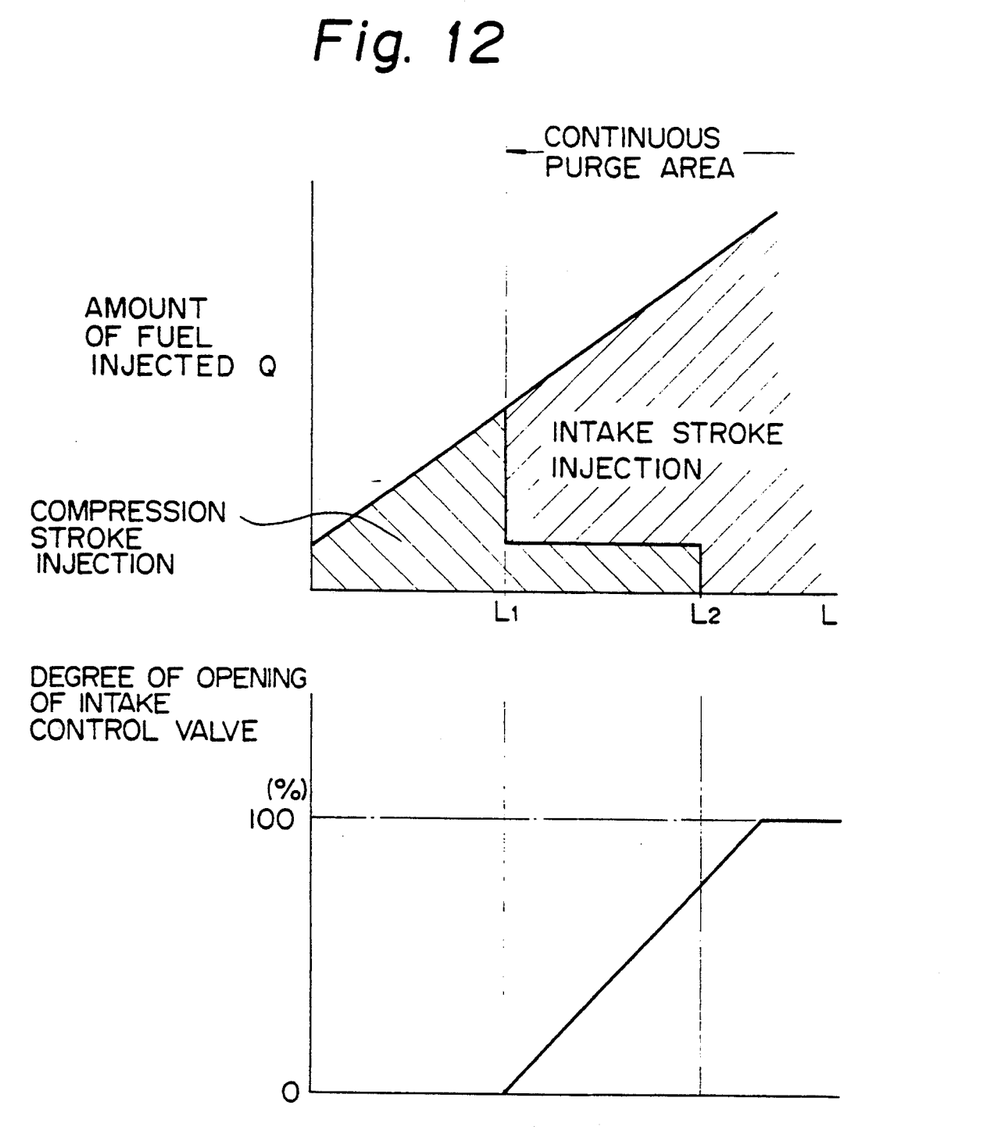
FIG. 12 is a diagram illustrating the amount of fuel injected and the degree of opening of the intake control valve.

FIG. 12 illustrates the degree of opening of each intake control valve 84. As illustrated in FIG. 12, when the engine is operating under a light load, the intake control valves 84 remains fully closed, and when the engine is operating under a middle load, the degree of opening of each intake control valve 84 is increased as the depression L of the accelerator pedal 38 becomes larger. When the intake control valves 84 are partially open, a vacuum is produced in each first intake passage 82 downstream of the corresponding intake control valve 84. Accordingly, at this time, if the solenoid 21 is open, fuel vapor is fed into the first intake passages 82 from the canister 14 even if an air feed pump is not provided. Therefore, as illustrated in FIG. 11, in this embodiment, the air chamber 16 of the canister 14 is open to the outside air via an air hole 88. In this embodiment, when the engine is operating under a light load, and the temperature T of the catalyzer is lower than the tolerable minimum temperature $T_0$, the solenoid valve 21 is closed, and thus the supply of fuel vapor to the intake duct 4 is stopped.

Next, the routine for executing the above-mentioned other embodiment will be described with reference to FIG. 13.

Figure 13:
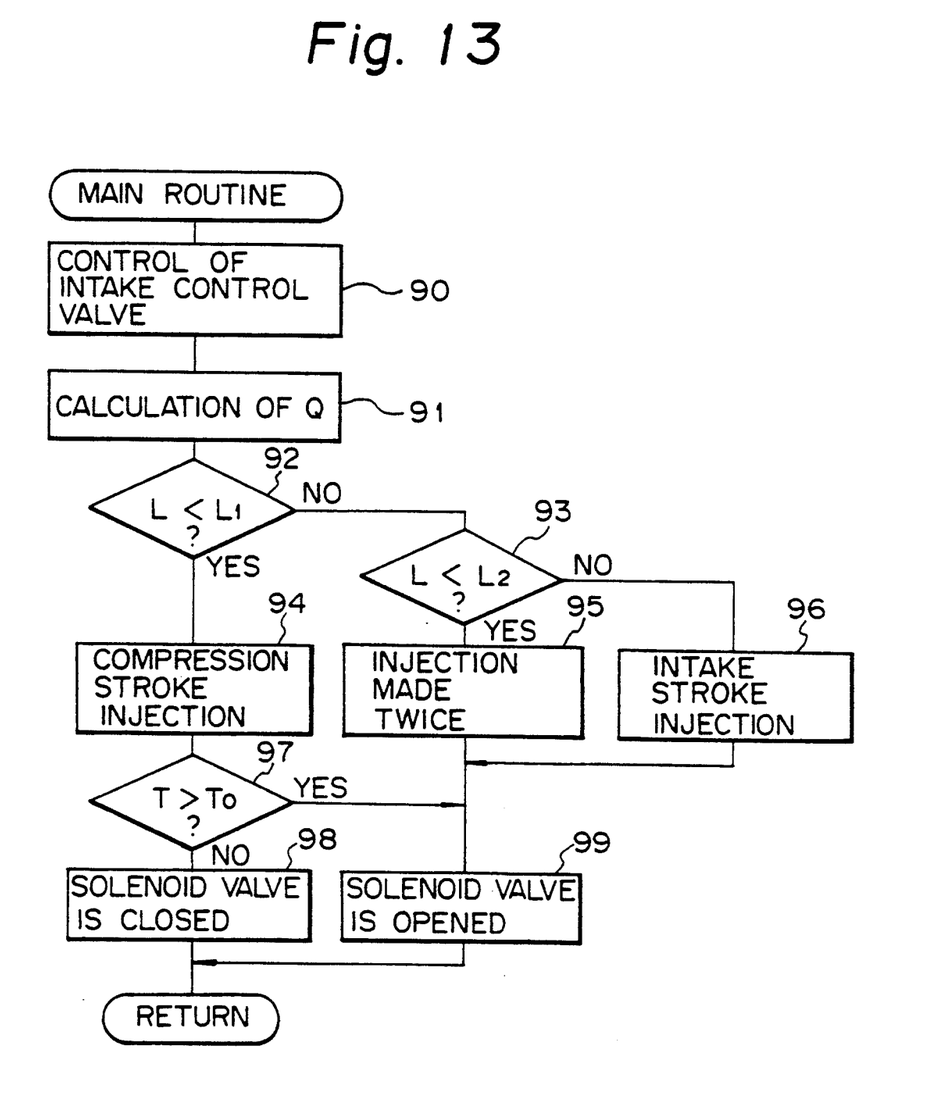
FIG. 13 is a flow chart for executing a second embodiment of a main routine.

Referring to FIG. 13, in step 90, the degree of opening of each intake control valve 84 is controlled so that it becomes equal to the degree of opening illustrated in FIG. 12. Then, in step 91, the amount of fuel injected Q is calculated. As illustrated in FIG. 10, this amount of fuel injected Q is stored in the ROM 33 as a function of the engine speed N and the depression L of the accelerator pedal 38. Then, in step 92, it is determined whether or not the depression L of the accelerator pedal 38 is smaller than $L_1$, i.e., the engine is operating under a light load. If $L<L_1$, the routine goes to step 94, and fuel is injected at the end of the compression stroke. The routine then goes to step 97. If $L\geq L_1$, the routine goes to step 93, and it is determined whether or not the depression L of the accelerator pedal 38 is smaller than $L_2$, i.e., the engine is operating under a middle load. If $L<L_2$, the routine goes to step 95, and fuel is injected twice; once at the beginning of the intake stroke and once at the end of the compression stroke. Then the routine goes to step 99. If $L\geq L_2$, i.e., the engine is operating under a heavy load, the routine goes to step 96, and fuel is injected at the beginning of the intake stroke. Then the routine goes to step 99.

In step 99, the solenoid valve 21 is opened. Accordingly, at this time, fuel vapor is purged into the intake duct 4.

In step 97, it is determined whether or not the temperature T of the catalyzer is higher than the tolerable minimum temperature $T_0$ on the basis of the output signal of the temperature sensor 10. If $T\geq T_0$, the routine goes to step 99. Accordingly, at this time, fuel vapor is purged into the intake duct 4. Conversely, if it is determined in step 97 that $T<T_0$, the routine goes to step 98, and the solenoid valve 21 is closed. Accordingly, at this time, the supply of fuel vapor to the intake duct 4 is stopped.

In the embodiments described above, each cylinder is provided with the single fuel injector 11, but in addition to the single fuel injector 11, another fuel injector may be arranged in the intake port of each cylinder to feed fuel through two fuel injectors in such a way that fuel is injected by the single fuel injector 11 only at the end of the compression stroke, and that fuel indicated by the intake stroke injection in FIG. 6 is injected into the corresponding intake port by the additional fuel injector.

According to the present invention, it is possible to suppress the discharge of harmful gas to the outside air.

While the invention has been described by reference to specific embodiments chosen for purposes of illustration, it should be apparent that numerous modifications could be made thereto by those skilled in the art without departing from the basic concept and scope of the invention.

I claim:

1. A direct injection type engine having a combustion chamber, an intake passage and an exhaust passage, said engine comprising:
   an air-fuel mixture forming means for forming an air-fuel mixture in a restricted region in the combustion chamber when an engine load is lower than a predetermined load and for forming an air-fuel mixture spreading over the entire interior of the combustion chamber when the engine load is higher than said predetermined load;
   a spark plug arranged in the combustion chamber to ignite said air-fuel mixture;
   catalytic means arranged in said exhaust passage for purifying the exhaust gas;
   detecting means for detecting a temperature of said catalytic means;
   fuel vapor supply means for purging fuel vapor into the intake passage; and
   control means for controlling said fuel vapor supply means to prohibit the purging operation of the fuel vapor when the engine load is lower than said predetermined load and the temperature, of said catalytic means is lower than a predetermined tolerable minimum temperature at which the exhaust gas is purified.

2. A direct injection type engine according to claim 1, wherein said control means controls said fuel vapor supply means to purge the fuel vapor into the intake passage when the engine load, is higher than said predetermined load, regardless of the temperature of said catalytic means.

3. A direct injection type engine according to claim 1, wherein said air-fuel mixture forming means comprises a fuel injector arranged in the combustion chamber for injecting fuel at the end of the compression stroke of the engine to form the air-fuel mixture in the restricted region in the combustion chamber and for injecting fuel at the beginning of the intake stroke of the engine to form the air-fuel mixture spreading over the entire interior of the combustion chamber.

4. A direct injection type engine according to claim 3, further comprising a piston having a top face having a depression formed thereon, said fuel injection injecting fuel toward said depression at the end of the compression stroke to form the air-fuel mixture in said depression.

5. A direct injection type engine according to claim 3, wherein said fuel injector injects fuel only once at the end of the compression stroke when the engine load is lower than a predetermined first load, and said fuel injector injects fuel twice, once at the beginning of the intake stroke and once at the end of the compression stroke, when the engine load is between said first load and a predetermined second load which is higher than said first load, said fuel injector injecting fuel only once at the beginning of the intake stroke when the engine load is higher than said second load, said control means prohibiting the purging operation of the fuel vapor when the engine load is lower than said first load and the temperature of said catalytic means is lower than said tolerable minimum temperature.

6. A direct injection type engine according to claim 5, wherein said control means controls said fuel vapor supply means to purge the fuel vapor into the intake passage when the engine load is higher than said first load, regardless of the temperature of said catalytic means.

7. A direct injection type engine according to claim 1, wherein said catalytic means comprises a catalytic converter arranged in the exhaust passage and having a catalyzer therein, and said detecting means comprises a temperature sensor for detecting the temperature of said catalyzer, said control means prohibiting the purging operation of the fuel vapor when the engine load is lower than said predetermined load and the temperature of said catalyzer is lower than said tolerable minimum temperature.

8. A direct injection type engine according to claim 1, wherein said fuel vapor supply means comprises a charcoal canister having an activated carbon layer therein for adsorbing fuel vapor, and said charcoal canister comprises a fuel vapor chamber arranged on one side of said activated carbon layer and connected to a fuel vapor source and, to the intake passage, via a purge control valve, and an air chamber arranged on another side of said activated carbon layer and connected to the outside air, said control means controlling said purge control valve to be open when the fuel vapor is to be purged into the intake passage and to be closed when the purging operation of the fuel vapor is to be stopped.

9. A direct injection type engine according to claim 8, wherein said fuel vapor source is a fuel tank.

10. A direct injection type engine according to claim 8, wherein said fuel vapor supply means comprises an air feed pump for discharging air into said air chamber to thereby purge fuel vapor into the intake passage.

11. A direct injection type engine according to claim 10, wherein said fuel vapor supply means comprises an air outflow shut valve arranged between said air chamber and the outside air, and said control means closes said air outflow shut valve when said air feed pump is operated.

12. A direct injection type engine according to claim 8, wherein the intake passage comprises a first passage connected to the combustion chamber via a first intake valve, a second passage connected to the combustion chamber via a second intake valve, and an intake control valve arranged in said first passage, and said fuel vapor chamber is connected to said first passage downstream of said intake control valve via said purge control valve.

13. A direct injection type engine according to claim 12, wherein said intake control valve is closed when the engine load is lower than said predetermined load, and the degree of opening of said intake control valve is increased as the engine load becomes higher and the engine load is higher than said predetermined load.

14. A direct injection type engine according to claim 8, wherein said fuel vapor supply means includes an adsorbing capability detecting means for determining whether or not the adsorbing capability of activated carbon for fuel vapor is saturated, and said control means controls said fuel vapor supply means to purge the fuel vapor into the intake passage when the adsorbing capability of activated carbon for fuel vapor is saturated even when the engine load is lower than said predetermined load and the temperature of said catalytic means is lower than said tolerable minimum temperature.

15. A direct injection type engine according to claim 14, wherein said adsorbing capability detecting means comprises a sensor for detecting the concentration of fuel vapor in said air chamber and determines that the adsorbing capability of activated carbon for fuel vapor is saturated when the concentration of fuel vapor in said air chamber exceeds a predetermined concentration.

16. A direct injection type engine according to claim 1, wherein said tolerable minimum temperature is a temperature at which the exhaust gas purifying rate of said catalytic means becomes approximately 80 percent.

* * * * *